United States Patent
Storm, Jr. et al.

(10) Patent No.: US 10,677,052 B2
(45) Date of Patent: Jun. 9, 2020

(54) REAL-TIME SYNTHETIC LOGGING FOR OPTIMIZATION OF DRILLING, STEERING, AND STIMULATION

(71) Applicant: QUANTICO ENERGY SOLUTIONS, LLC, Houston, TX (US)

(72) Inventors: Bruce H. Storm, Jr., Houston, TX (US); Barry Fen Zhang, Houston, TX (US)

(73) Assignee: QUANTICO ENERGY SOLUTIONS LLC, Houston, TX (US)

(*) Notice: Subject to any disclaimer, the term of this patent is extended or adjusted under 35 U.S.C. 154(b) by 4 days.

(21) Appl. No.: 16/273,383

(22) Filed: Feb. 12, 2019

(65) Prior Publication Data

US 2019/0169986 A1    Jun. 6, 2019

Related U.S. Application Data

(63) Continuation-in-part of application No. 14/298,638, filed on Jun. 6, 2014, now Pat. No. 10,242,312.
(Continued)

(51) Int. Cl.
*E21B 49/00* (2006.01)
*E21B 44/04* (2006.01)
(Continued)

(52) U.S. Cl.
CPC .......... *E21B 49/00* (2013.01); *E21B 44/00* (2013.01); *E21B 44/04* (2013.01); *E21B 45/00* (2013.01);
(Continued)

(58) Field of Classification Search
CPC .......... E21B 49/00; E21B 44/00; E21B 44/04; E21B 45/00; E21B 7/04; E21B 47/024;
(Continued)

(56) References Cited

U.S. PATENT DOCUMENTS

| | | | | |
|---|---|---|---|---|
| 5,862,513 A | * | 1/1999 | Mezzatesta | G01V 1/282 |
| | | | | 702/9 |
| 7,587,373 B2 | * | 9/2009 | Smith, Jr. | G06N 3/086 |
| | | | | 706/16 |

(Continued)

FOREIGN PATENT DOCUMENTS

| | | |
|---|---|---|
| CN | 108875122 A | 11/2018 |
| WO | 2013/036357 A1 | 3/2013 |

(Continued)

OTHER PUBLICATIONS

Dupriest et al, "Maximizing Drill Rates with Real-Time Surveillance of Mechanical Specific Energy", SPE/IADC Drilling Conference Netherlands Feb. 23-25, 2005 (Year: 2005).*

(Continued)

*Primary Examiner* — Regis J Betsch
(74) *Attorney, Agent, or Firm* — Patterson + Sheridan, LLP

(57) ABSTRACT

The present disclosure generally relates to a real-time synthetic logging method for optimizing one or more operations in a well. The method generally includes receiving measurements of one or more parameters in real time while performing operations in the well, the measurements being captured without using tools that include active nuclear sources. The method further includes providing the measurements as input to a machine learning algorithm (MLA) that is trained using historical or training well data. The method further includes generating, using the MLA and based on the measurements, a synthetic mechanical property log of the well. The method further includes generating, based on the synthetic mechanical property log, optimized parameters for at least one operation selected from the following list: drilling the well in real-time; steering the well in real-time; and stimulating a reservoir in real-time.

20 Claims, 6 Drawing Sheets

Related U.S. Application Data

(60) Provisional application No. 62/643,371, filed on Mar. 15, 2018.

(51) Int. Cl.
*E21B 45/00* (2006.01)
*G01V 1/50* (2006.01)
*E21B 44/00* (2006.01)
*G01V 11/00* (2006.01)
*E21B 7/04* (2006.01)
*E21B 47/024* (2006.01)

(52) U.S. Cl.
CPC .............. *G01V 1/50* (2013.01); *G01V 11/00* (2013.01); *E21B 7/04* (2013.01); *E21B 47/024* (2013.01); *G01V 2200/16* (2013.01); *G01V 2210/6222* (2013.01); *G01V 2210/6224* (2013.01); *G01V 2210/6244* (2013.01); *G01V 2210/72* (2013.01)

(58) Field of Classification Search
CPC ...... G01V 1/50; G01V 11/00; G01V 2200/16; G01V 2210/6222; G01V 2210/6224; G01V 2210/6244; G01V 2210/72
See application file for complete search history.

(56) References Cited

U.S. PATENT DOCUMENTS

| | | | |
|---|---|---|---|
| 2004/0117121 A1* | 6/2004 | Gray | G01V 1/30 702/11 |
| 2012/0239363 A1* | 9/2012 | Durrani | E21B 43/00 703/10 |
| 2018/0283157 A1* | 10/2018 | Hadi | E21B 44/04 |

FOREIGN PATENT DOCUMENTS

| | | |
|---|---|---|
| WO | 2015/187387 A1 | 12/2015 |
| WO | 2018/208634 A1 | 11/2018 |

OTHER PUBLICATIONS

Todd Robert Hamrick, "Optimization of Operating Parameters for Minimum Mechanical Specific Energy in Drilling", Thesis Department of Mechanical and Aerospace Engineering at West Virginia University, 2011 (Year: 2011).*

International Search Report issued to PCT/US2019/039468 dated Feb. 17, 2020.

Dongxiao Zhang et al.: "Synthetic well logs generation via Recurrent Neural Networks", Petroleum Exploration and Development Online, Aug. 4, 2018, pp. 629-639, XP055636040.

Database Compendex, Engineering Information, Inc., New York, NY, US 2003; Xia H et al.: "Research on the simulation of lwd curves and its geosteering application" XP002795273, Database accession No. E2003257510319 abstract & Tianranqi Gongye/ Natrual Gas Industry 2003 Natural Gas Industry Journal Agency CN, vol. 23, No. 3, 2003, pp. 51-55+6.

Alpana Bhatt: "Reservoir properties from well logs using neural networks", Nov. 1, 2002, XP055636045, Retrieved from the Internet: URL:http//www.ipt.ntnu.no/~bjornu/Aplana_Bhatt.pdf, p. iii, p. 137-145.

Paal Vegar Berg et al.: "Model for evaluting drilling efficiency based on the concept of Mechanical Specific Energy", Jun. 1, 2016, XP055666315.

Miguel Armenta et al.: "SPE 116667 Identifying Inefficient Drilling Conditions Using Drilling-Specific Energy", Sep. 24, 2008, XP055246056.

Chen Xuyue et al.: "Real-time optimiztion of drilling parameters based on mechanical specific energy for rotating drilling with positive displacement motor in the hard formation", Journal of Natural Gas Science and Engineering, Elsevier, Amsterdam, NL, vol. 35, Sep. 9, 2016, pp. 686-694, XP029777192, ISSN: 1875-5100.

* cited by examiner

REAL-TIME SYNTHETIC LOGGING FOR OPTIMIZATION OF DRILLING, STEERING, AND STIMULATION

RELATED APPLICATIONS

The present patent is a continuation of, and hereby claims priority under 35 U.S.C § 120 to pending U.S. patent application Ser. No. 14/298,638, entitled "SYNTHETIC LOGGING FOR RESERVOIR STIMULATION," naming BRUCE H. STORM JR. as the inventor, filed on 6 Jun. 2014, the contents of which are incorporated herein in their entirety.

This application claims the benefit of U.S. Provisional Application No. 62/643,371, entitled "REAL-TIME SYNTHETIC LOGGING FOR DRILLING PARAMETER OPTIMIZATION," naming BRUCE H. STORM JR. as the inventor, filed 15 Mar. 2018, the contents of which are incorporated herein in their entirety.

BACKGROUND OF THE DISCLOSURE

Field of the Disclosure

The present disclosure generally relates to real-time synthetic logging for optimization of drilling and/or steering a well, and/or stimulation of a reservoir.

Description of the Related Art

Measurements, such as seismic surveys, may be made prior to the drilling of a well. A host of measurements may be made in the course of drilling a well (e.g. rate of penetration (ROP), weight on bit (WOB), torque, logging while drilling (LWD), measurement while drilling (MWD), mud and cuttings analysis, and gas detection and analysis). With the exception of the formation evaluation data, the data collected while drilling is seldom used after the drilling process has been completed. Additional formation evaluation measurements may be made after the well is drilled by running logging tools in the open or cased hole well. The collected data is generally stored in archives after the well is completed.

In some cases, real-time adjustments may be made to the drilling process based on measurements collected while drilling. However, without the ability to measure a wide variety of parameters beneath the surface, it may be difficult to determine the optimum adjustments. For example, mechanical specific energy (MSE) and/or ROP may be measured in real-time at the surface, and changes in MSE and/or ROP may considered when determining adjustments to make to the drilling process, such as whether to increase or decrease WOB. However, without measuring a variety of sub-surface parameters, it may be difficult to identify the source of a change in MSE or ROP and, accordingly, to determine if certain adjustments will improve the process. As another example, real-time measurements of mechanical properties such as density, porosity, and/or sonic velocity may be used to make adjustments in reservoir stimulation plans and/or steering. However, measuring these sub-surface parameters may be difficult and/or expensive. For example, costs associated with tools used to measure density, porosity (and/or neutron porosity), and/or sonic velocity in real-time may be high, and certain tools (e.g., nuclear tools) are heavily regulated. As one example, a pulsed neutron capture (PNC) sonde utilizes deuterium and/or tritium making it an induced nuclear logging tool subject to government regulation and requiring special handling to avoid potential exposure should the tool become damaged. As another example, measuring sonic velocity downhole in real-time is particularly expensive due to high costs associated with operating acoustic logging tools, such as sonic sondes. Furthermore, the use of certain tools for capturing mechanical properties such as density, porosity, and/or sonic velocity may require the presence of additional personnel at a well site, thereby increasing costs as well as safety risks. For example, the presence of additional personnel to oversee and/or operate certain tools may increase health, safety, security and environment (HSSE) risks at the well site.

As such, there is a need for improved techniques of determining factors that affect drilling, steering, and reservoir stimulation in real-time.

SUMMARY OF THE DISCLOSURE

The present disclosure generally relates to real-time synthetic logging for optimized one or more operations in a well. In one embodiment, a real-time synthetic logging method for optimizing one or more operations in a well includes: receiving measurements of one or more parameters in real time while performing operations in the well, wherein the measurements are captured without using tools that include active nuclear sources; providing the measurements as input to a machine learning algorithm (MLA) that is trained using historical or training well data; generating, using the MLA and based on the measurements, a synthetic mechanical property log of the well, wherein the synthetic mechanical property log comprises at least one option selected from the following list: a real-time synthesized porosity at or near the bit position; a real-time synthesized density at or near the bit position; and a real-time synthesized sonic velocity at or near the bit position; and generating, based on the synthetic mechanical property log, optimized parameters for at least one operation selected from the following list: drilling the well in real-time; steering the well in real-time; and stimulating a reservoir in real-time.

In another embodiment, a computer-implemented method for optimizing a reservoir drilling process includes: determining a rock property comprising one of: a real-time unconfined compressive strength (UCS) at or near the bit position; or a real-time confined compressive strength (CCS) at or near the bit position; determining a mechanical specific energy (MSE) of the reservoir drilling process; determining an amount of energy required to rotate a drill string off-bottom; calculating a delta MSE by subtracting the amount of energy required to rotate the drill string off-bottom from the MSE; and determining, based on a relationship between the rock property and the delta MSE, an optimal value for a parameter of the reservoir drilling process.

In another embodiment, a system comprises one or more processors and a non-transitory computer-readable medium storing instructions which, when executed, cause the one or more processors to perform a real-time synthetic logging method for optimizing one or more operations in a well. The method includes: receiving measurements of one or more parameters in real time while performing operations in the well, wherein the measurements are captured without using tools that include active nuclear sources; providing the measurements as input to a machine learning algorithm (MLA) that is trained using historical or training well data; generating, using the MLA and based on the measurements, a synthetic mechanical property log of the well, wherein the synthetic mechanical property log comprises at least one option selected from the following list: a real-time synthesized porosity at or near the bit position; a real-time synthesized density at or near the bit position; and a real-time synthesized sonic velocity at or near the bit position; and generating, based on the synthetic mechanical property log, optimized parameters for at least one operation selected from the following list: drilling the well in real-time; steering the well in real-time; and stimulating a reservoir in real-time.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
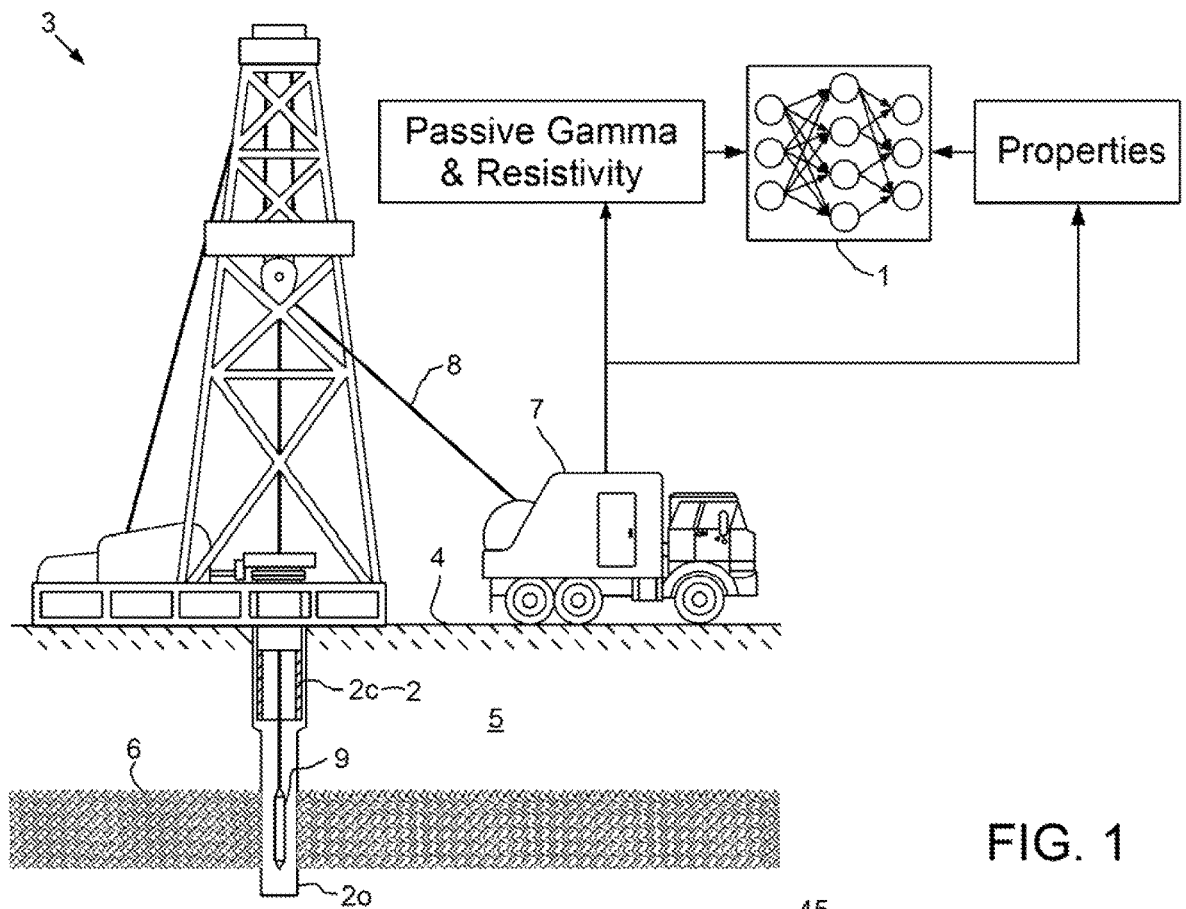
FIG. 1 illustrates a wireline logging operation for training a neural network, according to one embodiment of the present disclosure.

Embodiments of the present disclosure relate to real-time synthesizing of logs for optimized drilling and/or steering a well, and/or stimulation of a reservoir. For example, a neural network comprising machine learning algorithms (MLA) may be trained using historical measurements captured during past drilling, steering, and/or stimulation operations and/or exploratory measurements taken during exploratory operations, and the neural network may be used to synthesize certain parameters in real-time based on measurements taken while drilling and/or steering a well, and/or stimulating a reservoir.

A neural network (e.g., comprising MLA, as described herein) generally uses multiple inputs from different sensors to generate one or multiple outputs. The inputs can be taken at the same or different depths (or times) of the Outputs to be simulated. The individual inputs (e.g., $p_1, p_2 \ldots, p_R$) are weighted by the corresponding elements (e.g., $w_{1,1}, w_{1,2}, \ldots, w_{1,R}$) of the weight matrix W. Each neuron has a bias b, which is summed with the weighted inputs to form the net input $n=Wp+b$. The net input n is then applied to a transfer function $f$. The transfer function can be a linear or nonlinear function of n. A particular transfer function is selected based on the problem to solve. Typical transfer functions are linear, hard limit, hyperbolic Tangent Sigmoid (tansig), Log-Sigmoid (log sig) or Competitive functions. The output of a neuron a can be defined as $a=f(Wp+b)$.

A single-layer network of S neurons will operate over a vector of inputs p to generate an output a, while a combination of layers will create a multilayer neural network. A layer whose output is the network output is the output layer. The other layers are called hidden layers. After the architecture is defined, the next step is training the multilayer neural network. The preferred training method is called backpropagation, which is a generalization of the Least Mean Square error or LMS algorithm. Backpropagation is an approximate steepest descent algorithm, in which the performance index is mean square error. The general steps are: propagate the inputs forward to the network, then calculate the sensitivities backward through the network and use the sensitivities to update the weights and biases using a steepest descent rule. The process is repeated until the objective function is minimized, a number of iterations is executed or the error of an alternate set of data increases after a few iterations.

In the present solution, inputs may comprise measurements of one or more parameters made at the surface (and, in some embodiments beneath the surface using non-nuclear and/or passive nuclear tools) during drilling, steering, and/or stimulation, and outputs may comprise one or more of formation density, porosity, acoustic velocity and properties which may be derived from these properties. Examples of parameters measured at the surface may include ROP, WOB, torque, stand pipe pressure, differential pressure, flow rate, etc. In one embodiment, inputs include downhole survey data. In another embodiment, inputs include downhole natural gamma measurements.

While the preferred embodiment is to train the MLA to output properties which are analogs to conventional logging tool outputs, it is possible to train the MLA to output Young's modulus, Poisson's ratio, UCS, etc. directly rather than calculating them from analogs to logging tool outputs (density, porosity, acoustic velocity).

In some embodiments, the neural network's MLA may transform drilling parameters measured at the surface (inputs) into synthetic acoustic velocities, densities, porosities, and the like. The historical data which is required to develop (train) a model is obtained from one or more "training wells" which include the measurement of formation properties using subsurface sensors. Measurements of one or more input data parameters (e.g., parameters measured at the surface and/or using one or more non-nuclear and/or passive nuclear tools) and one or more output data parameters (e.g., acoustic velocity, density, porosity, and the like) are made in training wells and used to train the MLA.

The well(s) in which the current solution is applied to optimize drilling is/are generally referred to herein as the "target well(s)". In a target well, one or more parameters are measured and provided as inputs into the model to derive one or more synthetic output parameters describing properties of the rock at the position of the bit, without requiring measurement of the output parameter(s) in the target well(s). In one embodiment, the input data set is comprised of one or more measurements of drilling parameters made on the surface at the drilling rig, avoiding the need for sensors or measurements to be deployed in the wellbore. In another embodiment, subsurface survey data may be added to the input data set. In another embodiment, subsurface measurement of natural gamma radiation may be added to the input data set. In another embodiment, one or more of natural gamma, density and resistivity may be measured and used as an input to the MLA for calculating acoustic velocity. In another embodiment, one or more of natural gamma, velocity and resistivity may be measured and used as an input to the MLA for calculating density. In one embodiment, the present invention determines UCS in a target wellbore at the position of the bit by utilizing algorithms which provide synthetic acoustic velocities at the position of the bit without requiring conventional acoustic logging tool sources and sensors (e.g., which may be expensive) to acquire acoustic velocity measurements in the target wellbore. In another embodiment, the present invention determines UCS in a target wellbore at the position of the bit by utilizing algorithms which provide synthetic acoustic velocities at the position of the bit without requiring conventional acoustic logging tool sources and sensors at the position of the bit to acquire acoustic velocity measurements in the target wellbore at the position of the bit.

The unconfined compressive strength (UCS) or confined compressive strength (CCS) of the rock being drilled may be calculated using empirical relationships derived for the particular rock type. For example C Chang, et al (Journal of Petroleum Science and Engineering 51 (2006) 223-237) provides a survey of various equations useful for determining UCS from parameters measured while drilling a well. These equations utilize one or more of the acoustic velocity, density, porosity, Young's modulus, and Poisson's ratio as independent variables. In conventional practice, the acoustic velocity, density, and porosity may be measured in a well using LWD tools while drilling and/or steering a well, and/or stimulating a reservoir or by running WL, CT or through drill-string tools after drilling. Young's modulus and Poisson's ratio may be derived from various combinations of these parameters. In each of these methods, the necessary measurement is made a significant time after the drill bit traverses a section of rock. As such, UCS derived using data acquired via any of these means is too late to be considered in optimizing the drilling parameters of the subject well. The present solution substitutes parameters derived from the model (such as acoustic velocity) for those measured in the well and produces those results in real time, allowing for the UCS to be considered in a timely evaluation of drilling efficiency, steering, and/or stimulation.

Teale [Int. J. Rock Mech. Mining Sci Vol. 2, pp. 57-73. Pergamon Press 1965] introduced mechanical specific energy (MSE) as a means of measuring the efficiency of a drilling operation for a rock of constant UCS. Teal presented evidence that the most efficient drilling parameters were achieved when the MSE was minimized and that the theoretical minimum MSE was of the same magnitude as the UCS of the rock being drilled. Teale further suggested that, for a rock of constant properties, MSE may be minimized by varying WOB, all other drilling parameters remaining constant. However, prior to the present invention, there has been no means for providing an assessment of the value of the UCS of the rock at the location of the bit in real time, hence it is not conventionally known when a calculated MSE is near it's theoretical minimum value (consistent with the UCS).

Teale's work, while seminal, did not anticipate the use of mud motors or the drilling of deviated and horizontal drilling for appreciable distances. As such, Teal's MSE equation did not take into account their associated contributions to MSE. The current solution considers the contributions associated with drilling deviated boreholes and drilling with mud motors (or RSS tools). In such cases, the total energy supplied by the rotary (surface supplied rotational energy, e.g.: rotary table, top drive) is comprised of the energy required to remove rock and energy required to rotate the string off-bottom (without removing rock). When a mud motor is employed in the drill string, the energy supplied by the motor may be included in the calculation of the MSE. It is expected that the theoretical minimum MSE (Teale's MSE, plus motor energy, net of energy required to rotate the string off-bottom) is of the same order as the UCS (or CCS) of the rock. The present solution anticipates comparing the rotary and motor contributions to MSE, separately and in various combinations, to the UCS of the rock.

MSE may be expected to vary as a function of input drilling parameters (eg. WOB, revolutions per minute (RPM), flow rate, pressure, etc), drilling inefficiencies (e.g. vibration, crushing previously excavated rock, bit wear, etc) and/or due to changes in the character of the rock being drilled. For example, all other parameters remaining constant, if the UCS of the rock changes, it is to be expected that the associated MSE will change. In some instances it may be advantageous to adjust drilling parameters in order to minimize the MSE. It other cases, the inefficiencies may not be significant enough to warrant adjustment of the drilling parameters. For example, if the change in MSE is within a previously defined threshold "N" of the change in UCS ($\Delta$MSE/UCS<N) it may be concluded that any increase in "parasitic" losses is negligible or acceptable, and no action is required. In some instances, to may be desirable to set a threshold values of N in the range of 1.5 to 3.

In some situations, the energy required to rotate the string off-bottom may be large relative to the rotary energy supplied to the bit when on-bottom. When $\Delta$MSE/MSE<M ("M" being a previously defined threshold), a decision may be made to make a change in the drilling program as rotary energy is not being effectively transmitted to the bit. Changes may include increasing WOB, doping the mud with additives to reduce the friction, replacing the BHA, adding a vibratory tool and/or the like.

As the drilling bit wears, the drilling efficiency will decrease (measured as an increase in MSE). In some cases, the minimum achievable MSE may be such that $\Delta$MSE/UCS is greater than N, even though $\Delta$MSE has been minimized. Monitoring the trend of $\Delta$MSE/UCS for the minimum MSE achievable (by adjusting drilling parameters), allows the state of the BHA or bit to be monitored in real time and decisions made regarding when drilling efficiency has degraded to a point that a BHA (bit) should be pulled for replacement.

It is known in the industry that wells traversing similar geologic strata may be "tied" by correlating measured parameters across the wells. This may be done using unique features (patterns) in seismic data, gamma, density, acoustic velocity, or other formation properties. In the present invention one or more properties which are measured or simulated in the target well may be correlated with similar properties of one or more wells (generally referenced as off-set wells) traversing similar geology. Establishing a correlation between one or more features of a property in target and off-set wells allows for the properties of the off-set well to be "projected" onto the planned path of the target well. For example if formation top (or horizon) "X" is identified in both wells, and the bit is a known vertical distance $\Delta z$ below "X", it may be assumed that the value of a formation property in the target well at the position of the bit is the same as that property of the off-set well at a distance $\Delta z$ below "X" in the off-set well. In one embodiment, the current invention uses the projection of the off-set gamma to the position of the bit in the target well as an input to the MLA used to generate synthetic formation properties. In some instances, it may be known (e.g. via seismic data) that there are variations in the thickness of a geological interval between the off-set and target wells. In this case, the property of the target well at the relative position (e.g. vertical distance below "X" divided by the thickness of interval "XY") in the target well may be assumed to be that at the same relative position in the off-set well. In some embodiments, properties projected to the bit may be used as inputs to the MLA.

In an alternative embodiment, the present invention utilizes at bit formation properties determined from measurements made by subsurface sensors in order to derive the UCS of the rock (via empirical relationships such as presented by Chang et al). For example, the tool described in US patent application US2017/0067337 and related applications, might be used to determine one or more properties (e.g. Youngs modulus, Poisson's ratio, etc.) at or near the bit. Using these values in an empirical expression for UCS (such as found in Chang) allows the UCS of the rock at the bit to be determined. This UCS many then be used as a basis for determining if a change in drilling parameters is warranted to optimize drilling MSE.

In some embodiments, one or more synthesized parameters returned by the neural network may be included in a synthesized formation property log, such as a synthesized mechanical property log. Synthesized mechanical property logs that are generated using the neural network may, for example, be used to optimize certain drilling or steering parameters, generate stimulation plans, update seismic maps, update earth models, update seismic velocities, and the like. For example, optimized parameters for drilling the reservoir in real-time may be generated based on a synthesized mechanical property log in order to optimize certain properties, such as mechanical specific energy (MSE), rate of penetration (ROP), and the like. The ability to synthesize certain parameters at or near the bit position in real-time, such as porosity (and/or neutron porosity), density, sonic velocity, UCS, and/or CCS, allows for a more holistic understanding of factors affecting the drilling process, and thereby allows for intelligent adjustments to be made to drilling parameters in real-time. For example, synthesizing various parameters that affect MSE in real-time may allow for other parameters affecting MSE (e.g., those that can be controlled) to be adjusted in order to optimize MSE.

In one embodiment, MSE is determined in real-time based on a variety of measured parameters, such as WOB, cross-sectional area of bit, rotational rate, amount of torque applied, ROP, and the like. Energy required to rotate the string off-bottom may be subtracted from the total energy before calculating the MSE thus providing a modified MSE (labeled ΔMSE). The neural network may also be used to synthesize UCS (or, in some cases, CCS) of the rock at or near the bit position in real-time. A determination may be made as to whether a change in MSE is a result of the UCS. If the change in MSE is caused by the UCS, then an adjustment to the drilling process may not be necessary as the MSE may still be optimal. For example, ΔMSE may be calculated and it may then be determined whether a relationship between the ΔMSE and the UCS (e.g., a ratio of ΔMSE over UCS) is greater than a predetermined threshold. If the relationship is not above the threshold, then it may be determined that the change in MSE is a result of a change in UCS, and so no action may be taken. If the relationship is above the threshold, then instructions may be issued to adjust the WOB ni order to identify optimized drilling parameters, and the optimized drilling parameters may be used to update the drilling process in real-time (e.g., automatically or by providing instructions to an operator of an operational system, such as a drilling, steering and/or stimulation system). MSE and ΔMSE may then be determined again, if the new ΔMSE is less than the old ΔMSE, the ratio of the new ΔMSE over the UCS may be compared to the threshold. If the new ΔMSE is not less than the old ΔMSE, the WOB may be adjusted (increased or decreased), and a new ΔMSE may be determined based on new measurements. This process may be repeated until the ratio of ΔMSE over UCS reaches or drops below the threshold. As such, WOB may be adjusted until MSE is optimized as much as possible in view of the UCS. A similar process may be followed in which RPM, SPP, and/or flow rate are the parameters to be adjusted (as WOB was in the illustration above).

In some embodiments, a step size (e.g., amount) of an adjustment to a parameter (e.g., WOB) may be determined. For example, if an adjustment is made at a particular step size to WOB, and the adjustment results in too small or large of a change (e.g., the MSE rises or falls beyond a desired level, or fails to rise or fall to a desired level, in response to the adjustment), the step size may be varied accordingly.

In some embodiments, one or more mechanical properties synthesized in real-time in a target well as described herein, such as synthesized density, porosity, and/or sonic velocity, may be used to optimize steering parameters. As used herein, steering may refer to geosteering. Geosteering generally involves interactive geological placement of a precise (e.g., high angle) well path within a formation. Geological placement may be beneficial (e.g., as opposed to geometric placement) because of the uncertainty regarding positions of targets within a well that may result from the unpredictability of variations (e.g., structural and/or stratigraphic) that may occur in a well. Geosteering may, in some instance, involve comparing real-time LWD data to previously captured data (e.g., from a nearby or similar well) in order to guide a well path to optimum reservoir layers. During a drilling operation, geosteering may involve determining a location of the drill bit relative to layers in the formation. Inclination and azimuthal measurements may also be used in determining a steering path.

For example, mechanical properties may be synthesized in the target well using techniques described herein, and the synthesized mechanical properties may be correlated with similar properties of one or more off-set wells traversing similar geology. For example, peaks and valleys in a measured property from the off-set well may be compared to peaks and valleys of a corresponding synthesized property in the target well, such as in order to identify matching peaks and valleys that may be used to identify features (e.g., formation tops) of the target well based on known features of the off-set well. Establishing a correlation between one or more features of a property in target and off-set wells allows for the properties of the off-set well to be "projected" onto the planned path of the target well. As such the correlations may be used to determine one or more steering parameters in the target well in real-time. For example, a steering path and/or one or more directional parameters may be determined in real-time based on the synthesized mechanical properties. In some embodiments, instructions for steering using the optimized steering parameters may be transmitted to a steering system so that steering may be performed in real-time based on the optimized steering parameters.

In some examples, correlations between synthesized mechanical properties and similar properties measured in off-set wells may allow for identifying a number of possible geologic hazards, such as faults, synclines, anticlines, and karsting events in the target well. Identifying these possible geologic hazards allows for steering parameters to be adjusted in real-time to avoid the possible hazards. In certain examples, the correlations may allow for determining optimum paths, land-out depths, and the like for optimized steering. In some embodiments, a real-time position of one or more formation tops relative to a bit location may also be synthesized according to techniques described herein (e.g., based on synthesized density, porosity, and/or sonic velocity), and the synthesized positions of one or more formation tops may be used in determining an optimal steering path. In some cases, certain mechanical properties such as density, porosity, and sonic velocity allow for more accurate projection of features from an off-set well into the target well than do other properties, such as gamma measurements. The ability to synthesize mechanical properties such as density, porosity, and sonic velocity at or near the bit position in real-time as described herein, therefore, allows for improved geosteering without requiring the use of expensive and/or highly regulated tools for measuring these mechanical properties in the target well.

Furthermore, synthesized mechanical properties (e.g., density, porosity, and/or sonic velocity) and/or elastic properties may be used to optimize parameters for reservoir stimulation. For example, a stimulation plan may be generated for a reservoir based on one or more parameters synthesized as described herein. In certain examples, synthesized properties are supplied to a reservoir model in order to generate a stimulation plan for the reservoir. The stimulation plan may be a hydraulic fracturing plan. The fracturing plan may identify a number of production zones and, for each zone, list a setting depth of a fracture plug and a depth of perforation. The fracturing plan may also include a quantity of fracturing fluid to be used for each zone and mixture parameters for the fracturing fluid for each zone. The reservoir model may be implemented on the same computer as the neural network or on a different computer.

It is noted that the terms properties and parameters may, in some instances, be used interchangeably herein.

Techniques described herein constitute improvements with respect to conventional industry practice, as they allow for more targeted adjustments to be made to drilling, steering, and/or stimulation processes in order to optimize certain parameters without requiring difficult, expensive, and potentially dangerous down-hole measurements (e.g., by avoiding the use of tools with active nuclear sources and/or other tools that are difficult and/or expensive to operate, such as sonic tools). The ability to use computing technology to synthesize certain parameters, such as porosity, density, sonic velocity, UCS, and CCS, at or near the bit position in real-time (e.g., while drilling, steering, and/or stimulating), allows for efficiently achieving a greater understanding of the factors affecting the drilling, steering, and/or stimulation processes, and thereby facilitates the use of particular computer-implemented processes for parameter optimization. While conventional practices involve measuring properties at sensor depth, techniques described herein allow for synthesizing properties at or near the bit position, thereby improving precision and timeliness of determinations made based on the properties. For example, synthesizing UCS at or near the bit position in real-time allows for precise optimization of parameters affecting MSE without making unnecessary adjustments in an attempt to address MSE changes that are actually attributable to changes in rock properties (reflected in the UCS) rather than being attributable to drilling inefficiencies. Furthermore, techniques described herein may allow for the reduction of personnel present at a well site, thereby reducing costs as well as health, safety, security and environment (HSSE) risks.

It is noted that, while embodiments are described herein involving both operations for synthesizing properties at or near the bit position in real-time and operations for using the properties to optimize operational parameters in real time, these operations may be performed independently of one another. For example, properties may be synthesized at or near the bit position in real-time for purposes other than optimizing operational parameters, and techniques described herein for optimizing operational parameters based on properties at or near the bit position may be employed regardless of how the properties are determined.

FIG. 1 illustrates a wireline logging operation for training a machine learning algorithm, such as an artificial neural network 1, according to one embodiment of the present disclosure. The neural network 1 may be implemented on a computing device, such as a desktop computer, laptop computer, mobile phone, tablet, server, or mainframe. The operation may be conducted in a training wellbore 2 drilled using a terrestrial drilling system 3. The training wellbore 2 may be vertical and have a cased section 2c and an open hole section 2o. The training wellbore 2 has been drilled from a surface 4 of the earth, through an upper nonproductive formation 5, and into or through a lower hydrocarbon-bearing (i.e., crude oil and/or natural gas) reservoir 6. The reservoir 6 may be unconventional, such as shale.

A wireline truck 7 may be deployed to the wellsite. The wireline truck 7 may include a control room, a generator, a frame, and a winch having a deployment cable, such as wireline 8, wrapped therearound. The wireline 8 may be fed through a traveling block of the drilling system 3 and the winch operated to lower a logging tool 9 to a portion of the open hole section 2o traversing the reservoir 6. The wireline 8 may include one or more electrical conductors for supplying the logging tool 9 with power and communicating data from the logging tool to the control room of the truck 7. The wireline 8 may also include one or more layers of armor for supporting its own weight and that of the logging tool 9.

The logging tool 9 may include one or more induced nuclear sondes, such as a PNC sonde (aka pulsed neutron lifetime (PNL) sonde and/or carbon/oxygen sonde), density (aka gamma-gamma) sonde, and neutron porosity sonde. As is known in the art, induced nuclear sondes, density sondes, and neutron porosity sondes are tools that contain radioactive sources. The logging tool 9 may also include one or more passive (aka natural) nuclear sondes that do not contain radioactive sources, such as a gamma ray sonde and a spectral gamma ray sonde. The logging tool 9 may also include one or more nonnuclear sondes, such as a spontaneous potential (SP) sonde, resistivity sonde, a sonic sonde, nuclear magnetic resonance sonde, a caliper sonde, and a temperature sonde. Depth of the logging tool 9 may be monitored by a position sensor in communication with the winch. A cablehead may connect the logging tool 9 to the wireline 8 and include a load cell for monitoring tension in the wireline to compensate the measured depth for tension induced extension thereof. The logging tool 9 may be located at a vertical end of the reservoir 6 and operated while raising or lowering the logging tool to the other vertical end of the reservoir.

Once the logging run has been completed, the logging tool 9 may be recovered from the wellbore 2 and the measured data processed to determine one or more elastic property logs (aka mechanical property log or rock strength log) of the reservoir 6, such as Poisson's ratio, Young's modulus, shear modulus, bulk modulus, Biot's constant, Lame's constant, modulus of compressibility, brittleness index, and rock strength. The measured data may also be processed to determine one or more other property logs of the reservoir 6, such as a density log, a sonic velocity log (shear and/or compressional), and a production index log. The determined logs (e.g., determined based on data that may be captured using one or more tools containing radioactive sources, such as density sondes, neutron porosity sondes, and induced nuclear sondes, as well as data captured in some embodiments using tools that do not contain radioactive source, such as passive nuclear sondes and/or non-nuclear sondes) may then be used as training outputs in conjunction with the data captured using tools that do not contain radioactive sources, such as passive nuclear sondes and/or non-nuclear sondes, which may serve as training inputs, to train the neural network 1 for synthesizing one or more of the elastic property logs, density logs, porosity logs, and/or sonic velocity logs (e.g., one or more synthesized elastic property logs, density logs, porosity logs, and/or sonic velocity logs are output by the neural network 1) using measurements taken at the surface and/or data logged by one or more of the tools that do not contain radioactive source, such as passive nuclear sondes and/or nonnuclear sondes (not the induced nuclear sondes) as inputs to the neural network 1.

In another example, neural network 1 may be trained using training inputs comprising parameters measured at the surface while drilling in historical or training wellbores, such as ROP, WOB, torque, mud and cuttings analysis, gas detection and analysis and, in some embodiments, certain subsurface measurements from the historical or training wellbores, such as gamma and survey data. Neural network 1 may further be trained using training outputs (e.g., elastic property logs, density logs, porosity logs, and/or sonic velocity logs) derived from both the training inputs and additional measurements of parameters such as density, porosity, and sonic velocity (e.g., parameters measured in the historical or training wellbores using one or more tools containing radioactive sources, such as density sondes, neutron porosity sondes, and induced nuclear logging tools). Once trained, neural network 1 may be able to synthesize a log comprising one or more properties such as density, porosity, sonic velocity, and elastic properties, which are output from neural network 1 based on inputs of parameters measured at the surface while drilling in a production wellbore, such as ROP, WOB, torque, mud and cuttings analysis, gas detection and analysis and, in some embodiments, certain subsurface measurements from the production wellbore, such as gamma and survey data. As such, parameters such as density, porosity, and sonic velocity may be synthesized using neural network 1 without requiring the use of tools containing radioactive sources, such as density sondes, neutron porosity sondes, and induced nuclear logging tools, or acoustic tools in a production wellbore. For example, techniques described herein may allow for sonic velocity to be synthesized in a production wellbore without using sonic tools, which may be expensive and/or difficult to use.

Alternatively, the measured wireline tension may also be used to train the neural network 1. Alternatively, the neural network 1 may be trained using historical data collected from similar reservoirs. Alternatively, the neural network 1 may be trained using the historical data and calibrated using the logging data from the training wellbore 2. Alternatively, the cased 2c and/or open hole 2o section of the training wellbore 2 may be deviated, such as slanted or horizontal. Alternatively, the open hole section 2o may be cased for the logging operation. Alternatively, the reservoir 6 may be logged while drilling the open hole section 2o.

Figure 2B:
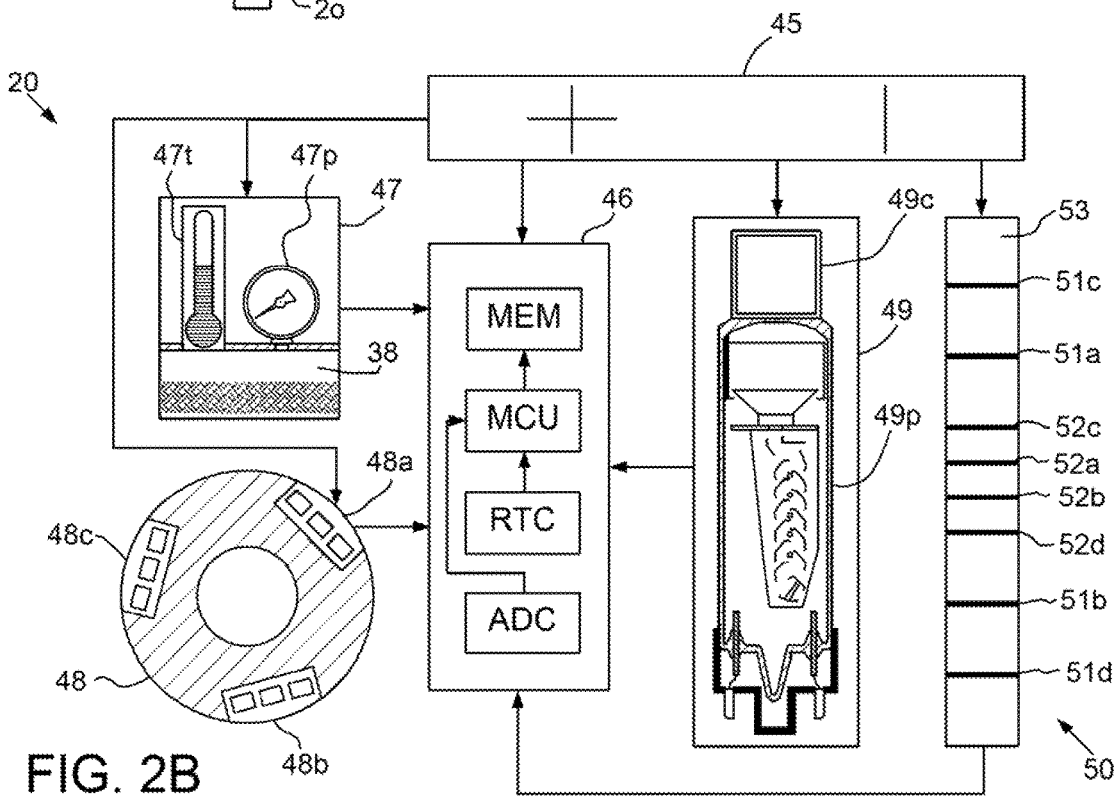
FIG. 2B illustrates a LWD tool of FIG. 2A.
Figure 2A:
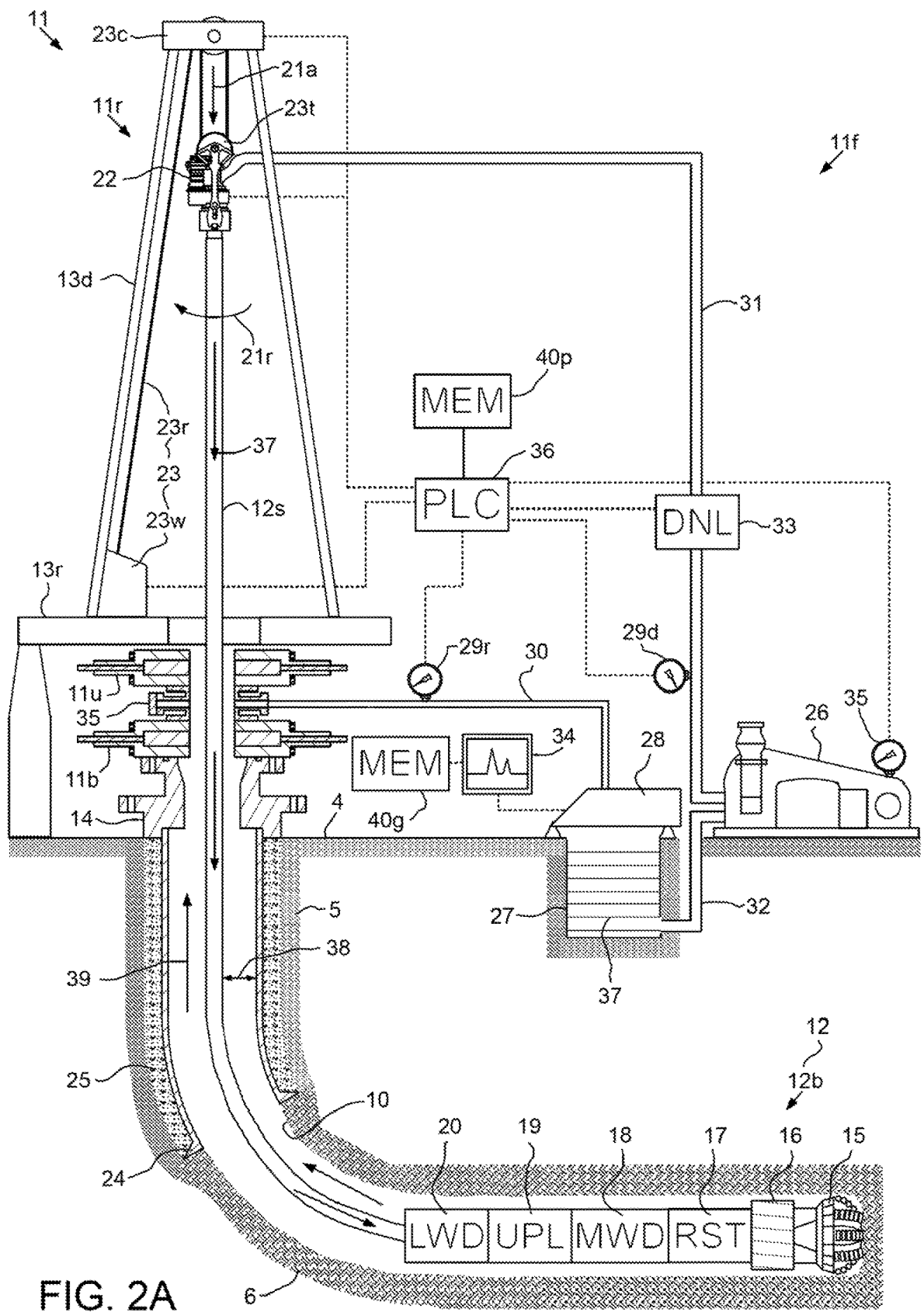
FIG. 2A illustrates logging while drilling (LWD) a training wellbore from which training data is obtained.

FIG. 2A illustrates logging while drilling (LWD) a training wellbore 10. The LWD operation may be conducted in the training wellbore 10 using a terrestrial directional drilling system 11 such that the training wellbore has a deviated, such as horizontal, lower portion. An upper portion of the training wellbore 10 may be vertical (shown) or slanted. The directional drilling system 11 may include a drilling rig 11r, a fluid handling system 11f, one or more blowout preventers (BOPs) 11u,b, and a drill string 12. The drilling rig 11r may include a derrick 13d, top drive 22, draw works 23, and a floor 13r at its lower end having an opening through which the drill string 12 extends downwardly into the training wellbore 10 via the BOPs 11u,b. The BOPs 11u,b may be connected to a wellhead 14.

The drill string 12 may include a bottom hole assembly (BHA) 12b and a drill stem 12s. The drill stem 12s may include joints of drill pipe connected together, such as by threaded couplings. The BHA 12b may be connected to the drill stem 12s, such as by threaded couplings, and include a drill bit 15, a near bit stabilizer 16, a rotary steering tool (RST) 17, a measurement while drilling (MWD) tool 18, a telemetry uplink (UPL) 19, and the LWD tool 20. The BHA members 15-20 may be interconnected, such as by threaded couplings. The drill bit 15 may be rotated 21r by the top drive 22 via the drill stem 12s.

Alternatively, the BHA 12b may include a drilling motor in addition to the RST 17. Alternatively, the drill stem 12s may be coiled tubing. The MWD tool may include wellbore survey instrumentation and natural gamma sensors.

The MWD tool 18 may include a mandrel having threaded couplings formed at each longitudinal end thereof, an electronics package mounted on the mandrel, a sensor package mounted on the mandrel, a housing connected to the mandrel to protect the packages, and a battery disposed between the housing and the mandrel. The electronics package may include a microcontroller (MCU), a clock, and an analog to digital converter. The electronics package and sensor package may be in electrical communication by leads, a bus, or integration on a printed circuit board. The sensor package may include one or more pressure sensors, such as a bore pressure sensor and an annulus pressure sensor, an angular speed sensor, an inclination sensor, and an azimuth sensor.

The angular speed sensor may include one or more single axis accelerometers. The accelerometers may be piezoelectric, magnetostrictive, servo-controlled, reverse pendular, or microelectromechanical. The accelerometers may be radially oriented relative to the mandrel to measure the centrifugal acceleration due to rotation thereof for determining the angular speed and spaced around the mandrel to account for centrifugal acceleration due to lateral vibration and/or gravity. The inclination sensor may be oriented along a longitudinal axis of the mandrel to measure inclination relative to gravitational direction. The inclination sensor may also be any of the single axis accelerometers. The azimuth sensor may include one or more, such as three orthogonally oriented, magnetometers.

Alternatively, the angular speed sensor and/or the inclination sensor may be a gyroscope or magnetometer. Alternatively, the sensor package may further include an angular acceleration sensor. Alternatively, the sensor package may further include a load cell for measuring WOB.

The MWD electronics package may further include a modem in electrical communication with the UPL 19 for operation thereof to send measurements by the sensor package to a programmable logic controller (PLC) 36. Each of the UPL 19 and a telemetry downlink (DNL) 33 may be a mud pulser. The modem may also be in data communication with the bore pressure sensor to receive mud pulses from the DNL 33 for communication of steering instructions from the PLC 36.

Alternatively, the UPL 19 may be a gap sub and the DNL 33 may be a casing antenna for electromagnetic telemetry instead of mud pulse. Alternatively, the drill stem 12s may be wired with a pair of electrical conductors to supply the BHA 12b with power and provide data communication between the BHA and the PLC 36.

The MWD MCU may also be in electrical communication with the RST 17. The RST 17 may include a mandrel having threaded couplings formed at each longitudinal end thereof and a housing having an actuator and a plurality of levers spaced therearound, such as three spaced at one hundred twenty degree intervals. The housing may be supported from the mandrel by bearings such that the housing may remain rotationally stationary relative to the mandrel. The actuator may include a hydraulic pump driven by relative rotation between the housing and the mandrel and a piston connected to each lever, a cylinder keeping each piston, and a manifold selectively providing fluid communication between each piston and the pump for extension or retraction of the respective lever. The MWD MCU may receive steering instructions from the PLC 36 and operate one or more of the levers to point the bit 15 along the instructed path.

Alternatively, the BHA 12b may further include a bent sub and drilling motor instead of the RST 17 and the drilling motor may rotate the drill bit 15 while the drill stem 12s is selectively rotated to shift between a sliding mode and a rotary mode. Alternatively, the RST 17 may be a push type and the near bit stabilizer 16 may be omitted.

An upper end of the drill stem 12s may be connected to a quill of the top drive 22. The top drive 22 may include a motor for rotating 21r the drill string 12. The top drive motor may be electric or hydraulic. A frame of the top drive 22 may be coupled to a rail (not shown) of the derrick 13d for preventing rotation of the top drive frame during rotation 21r of the drill string 12 and allowing for vertical movement of the top drive with a traveling block 23t. The frame of the top drive 22 may be suspended from the derrick 2 by the traveling block 23t. The traveling block 23t may be supported by wire rope 23r connected at its upper end to a crown block 23c. The wire rope 23r may be woven through sheaves of the blocks 23c,t and extend to a winch 23w for reeling thereof, thereby raising or lowering the traveling block 23t relative to the rig floor 13r.

The wellhead 14 may be mounted on a casing string 24 which has been deployed into the training wellbore 10 and cemented 25 therein. The casing string 24 may have a shoe located adjacent a boundary between the upper formation 5 and the reservoir 6.

Alternatively, the training wellbore 2 and training wellbore 10 may be subsea having a wellhead located adjacent to the waterline and the drilling rig 11r may be a located on a platform adjacent the wellhead. Alternatively, the wellbores 2, 10 may be subsea having a wellhead located adjacent to the seafloor and a marine riser may connect the wellhead to an offshore drilling unit. Alternatively, a Kelly and rotary table may be used to rotate the drill stem 12s instead of the top drive 22. Alternatively, the upper portion of the training wellbore 10 may be logged during or after drilling and the logging data therefrom used to train and/or calibrate the neural network 1.

The fluid system 11f may include a mud pump 26, a drilling fluid reservoir, such as a pit 27 or tank, a solids separator, such as a shale shaker 28, one or more pressure sensors 29d,r, one or more flow lines, such as a return line 30, a supply line 31, and a feed line 32, the DNL 33, a mud logging tool 34, and a stroke counter 35. A first end of the return line 30 may be connected to a flow cross 35 mounted on the wellhead 14 and a second end of the return line may be connected to an inlet of the shaker 28. The returns pressure sensor 29r may be assembled as part of the return line 29. A lower end of the supply line 31 may be connected to an outlet of the mud pump 26 and an upper end of the supply line may be connected to an inlet of the top drive 22. The supply pressure sensor 29d and the DNL 33 may be assembled as part of the supply line 31.

Each pressure sensor 29d,r may be in data communication with the PLC 36. The returns pressure sensor 29r may be operable to monitor wellhead pressure and the supply pressure sensor 29d may be operable to monitor standpipe pressure. The stroke counter 35 may also be in data communication with the PLC 36 and may be operable to monitor a flow rate of the mud pump 26. The PLC 36 may also be in communication with a hook load detector (depicted by dotted line to crown block 23c) clamped to the wire rope 23r, and a position sensor of the winch 23w for monitoring depth of the BHA 12b. The PLC 36 may further be in communication with a torque sensor and tachometer of the top drive 22. The PLC 36 may know parameters of the drill string 12 for calculating WOB. The drill string parameters may further include drill bit type and drill bit size. The PLC 36 may also calculate ROP. The PLC 36 may record the various measurements and calculations in a memory unit (MEM) 40p for later use. The drill string parameters may also be recorded in the MEM 40p for later use.

To extend the wellbore 10 from the casing shoe into the reservoir 6, the mud pump 26 may pump drilling fluid 37 from the pit 27, through the supply line 31, and to the top drive 22. The drilling fluid 37 may include a base liquid. The base liquid may be refined or synthetic oil, water, brine, or a water/oil emulsion. The drilling fluid 37 may further include solids dissolved or suspended in the base liquid, such as organophilic clay, lignite, and/or asphalt, thereby forming a mud.

Alternatively, the drilling fluid 37 may further include a gas, such as diatomic nitrogen mixed with the base liquid, thereby forming a two-phase mixture. Alternatively, the drilling fluid may be a gas, such as nitrogen, or gaseous, such as a mist or foam. If the drilling fluid 37 includes gas, the drilling system 1 may further include a nitrogen production unit (not shown) operable to produce commercially pure nitrogen from air.

The drilling fluid 37 may flow from the supply line 31 and into a bore of the drill stem 12s via the top drive 22. The drilling fluid 37 may flow down the drill stem 12s, through a bore of the BHA 12b, and exit the drill bit 15, where the fluid may circulate cuttings away from the bit and return the cuttings up an annulus 38 formed between an inner surface of the casing 24 or wellbore 10 and an outer surface of the drill string 12. The returns 39 (drilling fluid 37 plus cuttings) may flow up the annulus 38, to the wellhead 14, and exit the wellhead through the flow cross 35. The returns 39 may continue through the return line 30. The returns 39 may then flow into the shale shaker 28 and be processed thereby to remove the cuttings, thereby completing a cycle. As the drilling fluid 37 and returns 39 circulate, the drill string 12 may be rotated 21r by the top drive 22 and lowered 21a by the traveling block 23c, thereby extending the wellbore 10 into the reservoir 6.

As the drilling fluid 37 is being pumped into the training wellbore 10 by the mud pump 26 and the returns 39 are being received from the return line 30, the mud logging tool 34 may analyze the cuttings. The mud logging tool 34 may include an extractor for separating gas entrained in the cuttings, a gas analyzer, and a carrier system for delivering the gas sample to the analyzer. The gas analyzer may be a chromatograph or optical analyzer. The mud logging tool 34 may further include a source rock analyzer (SRA) for elemental analysis and/or mineral composition of the cuttings. The SRA may include a pyrolyzer, such as an oven or laser, an infrared cell, and a flame ionization detector. The measurements by the mud logging tool 34 may be recorded in a MEM 40g for later use. Parameters of the drilling fluid 37, such as density (aka mud weight) and resistivity may be measured by the mud logging tool and/or input by the mud engineer and stored in the MEM 40g for later use.

An equivalent circulation density (ECD) of the drilling fluid 37 may be greater than a pore pressure gradient of the reservoir 6 such that an overbalanced condition is maintained during drilling thereof.

Alternatively, the ECD of the drilling fluid 37 may be less than or equal to the pore pressure gradient such that a balanced or underbalanced condition is maintained during drilling of the reservoir 6. For balanced or underbalanced drilling, the drilling system may further include a rotating control device connected to the wellhead 14 (above the flow cross 35) and having a rotating seal engaged with the drill stem 12s. In this alternative, the drilling system 11 may further include a variable choke valve assembled as part of the return line 30 and in communication with the PLC 36 for operation thereby and a mud-gas separator (MGS) assembled as part of the return line 30. In this alternative, the gas analyzer may then be in communication with a gas outlet of the MGS, thereby obviating the need for an extractor.

FIG. 2B illustrates the LWD tool 20. The LWD tool 20 may include a control module 45-48 and one or more passive nuclear or non-nuclear sondes, such as a gamma sonde 49 and a resistivity sonde 50. In the training wellbore, the LWD may also contain nuclear sondes (density and or porosity) as well as acoustic velocity sondes. The sondes 49, 50 may each be in electrical communication with the control module 45-48, such as by wired threaded couplings. The LWD tool 20 may be operated to log the reservoir 6 during drilling of the reservoir and/or while retrieving (aka tripping out) the BHA 12b from the training wellbore 10 after drilling has been completed.

Alternatively, a logging tool may be deployed into the training wellbore 10 using wireline after the reservoir 6 has been drilled and the drill string 12 retrieved from the wellbore. Alternatively, the logging tool may be deployed through the drill stem 12s after drilling has finished but before removal of the drill string 12 from the training wellbore 10 by including a drill bit having a removable inner portion or by adding a disconnect tool to the BHA 12b. In this alternative, the BHA/drill bit inner portion may be released at a bottom of the training wellbore and the logging tool may be deployed through the drill stem 12s using wireline and a tractor or may be pumped down to assist wireline deployment or pumped down without wireline. In this alternative, once the logging tool reaches a bottom of the drill stem 12s, the reservoir may be logged by retrieving the drill stem until the bottom reaches the casing shoe. In this alternative, once the reservoir 6 has been logged, the logging tool may be retrieved to the rig 11r and the drill stem 12s may be lowered and reconnected to the BHA/drill bit inner portion.

The control module 45-48 may include a mandrel having threaded couplings formed at each longitudinal end thereof, an electronics package 46 mounted on a housing, the housing connected to the mandrel, a sensor package 47, 48 mounted on the housing, and a battery 45 disposed between the housing and the mandrel. The electronics package 46 may include a MCU, a clock (RTC), an analog to digital converter (ADC), and a MEM. The MEM may be a solid state drive. The electronics package 46 may additionally include a power converter for inverting a power signal from the battery 45 to an appropriate power signal for supplying the caliper 48. The electronics package 46 and sensor package 47, 48 may be in electrical communication by leads, a bus, or integration on a printed circuit board. The sensor package 47, 48 may include an annulus pressure sensor 47p, an annulus temperature sensor 47t, and a solid state caliper 48.

The caliper 48 may include one or more ultrasonic sensors 48a-c spaced around the control module housing, such as three spaced at one hundred twenty degree intervals, each sensor having a sensor block housing one or more (three shown) piezoelectric transducer elements. Alternatively, the transducer elements may be magnetostrictive. A central transducer element of each sensor 48a-c may be oriented to have a sensitive axis along a radial axis of the control module and may be operable to both transmit and receive ultrasonic waves in a pulse echo mode. Peripheral transducer elements of each sensor 48a-c may straddle the respective central transducer element and each may be operable to receive the respective ultrasonic waves reflected from a wall of the training wellbore 10 in a pitch catch mode. The MCU may receive the reflection measurements from the transducer elements during drilling and record the measurements in the MEM for later processing to determine a size and shape of a lower portion of the training wellbore 10.

The passive gamma sonde 49 may include a drill collar and a detector 49c,p mounted in a pocket formed in an outer surface of the drill collar. Alternatively, the sonde 49 may include a plurality of detectors 49c,p spaced around the drill collar, such as three at one hundred twenty degree intervals. The detector 49c,p may include a solid-state scintillation crystal 49c, such as a sodium iodide crystal, in optical communication with a photomultiplier tube 49p. In operation, gamma rays naturally emitted by the reservoir 6 may be absorbed by the crystal 49c which may in turn emit a flash of light for each absorption. Each light flash may be converted into an electrical pulse by the photomultiplier tube 49p. The MCU may count the pulses and record the count in the MEM. Additionally, the MCU may record the size of the pulses and record the sizes for later spectral analysis.

The resistivity sonde 50 may include a plurality of transmitters 51a-d and a plurality of receivers 52a-d disposed along an outer surface of a drill collar 53. The drill collar may be made from a nonmagnetic metal or alloy, such as austenitic stainless steel or nickel based alloy. The resistivity sonde 50 may further include a power converter (not shown) for inverting a power signal from the battery 45 to appropriate power signals for supplying the transmitters 51a-d. Each of the transmitters 51a-d and receivers 52a-d may be coil antennas. The transmitters 51a-d and receivers 52a-d may be operated in pairs to transmit electromagnetic signals into the reservoir 6, such as a first pair including transmitters 51a,b and receivers 52a,b and a second pair including transmitters 51c,d and receivers 52c,d. For each pair, each receiver 52*a-d* may be longitudinally spaced from the other receiver by a first constant distance and each transmitter 51*a-d* may be longitudinally spaced from a respective receiver 52*a-d* by a second constant distance. The second constant distance may be greater or substantially greater than the first constant distance, such as two-ten times the first constant distance.

The electromagnetic signals may have a frequency in the range of one hundred kHz to ten MHz. Each pair of transmitters 51*a-d* may simultaneously transmit a first signal at a high frequency, such as greater than one MHz, and a second signal at a substantially lower frequency, such less than or equal to one MHz. For each pair, a first transmitter 51*a,c* may transmit at the high frequency and a second transmitter 51*b,d* may transmit at the lower frequency and then the transmitters may be reversed or the first transmitter may transmit at both frequencies while the second transmitter is idle and then the second transmitter may be operated to transmit at both frequencies while the first transmitter is idle.

The high frequency signals may penetrate the reservoir 6 to a relatively shallow radial distance and the lower frequency signals may penetrate the reservoir to a deeper radial distance. The receivers 52*a-d* may measure signal phase and attenuation which may be stored in the MEM by the MCU and later processed to compensate for factors having adverse effects on the measurements, such as fluid invasion and variations in wellbore size. The compensated signal phase and attenuation values may then be used to calculate a resistivity log for the reservoir 6.

Alternatively, the LWD tool 20 may include any of the other nonnuclear sondes discussed above instead of or in addition to the resistivity sonde 50 and/or the passive gamma sonde 49.

It is noted that, while FIGS. 1-2B are generally applicable to training wells, aspects of FIGS. 1-2B may also relate to target wells. In some embodiments, a full suite of LWD tools may or may not be run in the well to be optimized (e.g., the target well). In either case, conventional LWD is not capable of providing mechanical properties (e.g., UCS) at or near the bit position, as the necessary measurements (e.g. sonic velocity) are placed too far away from the bit to provide information regarding formation properties in time to make real time adjustments required to optimize drilling, steering, and/or stimulation processes. The MLA is capable of providing density, sonic velocities (shear and compressional) and porosity, making these sensors in an LWD tool redundant in a target or production well.

Figure 3:
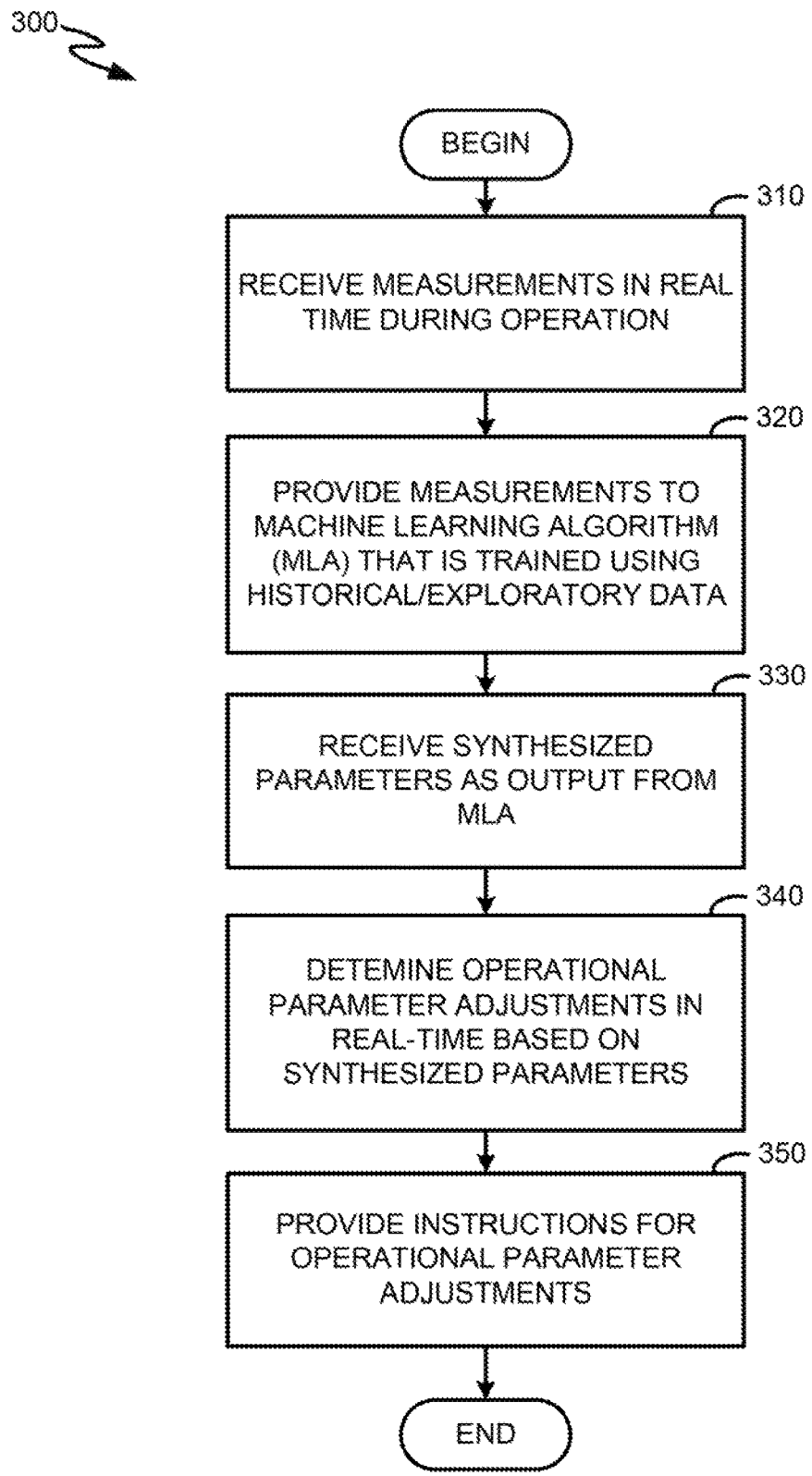
FIG. 3 illustrates example operations related to synthetic logging for optimized drilling and/or steering a well, and/or stimulation of a reservoir, according to embodiments of the present disclosure.

FIG. 3 illustrates example operations 300 related to real-time synthetic logging for optimized drilling and/or steering a well, and/or stimulation of a reservoir, according to embodiments of the present disclosure. Operations 300 may, for example, be performed by an operation improvement engine. The operation improvement engine may, for example, be implemented using one or more computing systems including one or more processors and a non-transitory computer readable medium comprising instructions for performing techniques described herein.

Operations 300 begin at step 310, where real-time parameter measurements are received from an operational system (e.g., a system that performs operations related to drilling, steering, and/or stimulation). The measurements may, for example, comprise measurements of parameters that were captured using surface-level tools, gamma sondes, and the like. Parameters that are measured in real-time may comprise ROP, WOB, torque, LWD, MWD, mud and cuttings analysis, gas detection and analysis, gamma measurements, angles, azimuths, and the like. Parameters measured at or near the bit position in real-time do not include density, sonic velocity, UCS, and CCS, as these are provided by the MLA.

At step 320, the measurements are provided to a neural network comprising a machine learning algorithm (MLA) that has been trained using historical and/or training well data according to techniques described herein (e.g., as described above with respect to FIGS. 1-2B).

At step 330, synthesized parameters are received as output from the MLA. For example, the MLA may synthesize one or more parameters at or near the bit position in real-time based on the measurements, in view of historical and/or training well data, and/or based on empirical relationships between the measured parameters and the parameters that are synthesized. The synthesized parameters are different than the parameters that were measured at or near the bit position. For example, the MLA may synthesize density, sonic velocity, porosity, UCS, and/or CCS at or near the bit position in real-time based on real-time measurements of ROP, WOB, torque, mud and cuttings analysis, gas detection and analysis, natural gamma measurements, angles, azimuths, and/or the like. UCS may, for example, be synthesized based at least in part on a function involving sonic velocities. In some embodiments, step 330 further comprises determining a real-time synthesized position of one or more formation tops relative to a bit location. One or more parameters synthesized at step 330 may be included in a synthesized properties log.

At step 340, operational parameter adjustments are determined in real-time based on the synthesized parameters. For example, a synthesized UCS may be used to determine adjustments to parameters affecting MSE, such as WOB, in order to optimize MSE. In one example, WOB is adjusted if a relationship between MSE and UCS is above a certain threshold. In other examples, adjustments to one or more steering parameters (e.g., a steering path) may be determined based on the synthesized parameters. For example, the synthesized parameters may be compared to data from an off-set well in order to determine an optimal steering path through the well. In other examples, a stimulation plan may be determined based on the synthesized parameters.

At step 350, instructions including the operational parameter adjustments are provided to the operational system. Adjustments may then be made at the operational system in accordance with the instructions. For example, WOB may be decreased at the operational system if the instructions comprise a decrease in WOB. In another example, a steering path may be updated at the operational system if the instructions comprise an updated steering path. In another example, one or more attributes of a stimulation plan may be updated at the operational system if the instructions comprise updates to the stimulation plan. In certain embodiments, the operational system may continue to provide real-time measurements to the operation improvement engine in order to continuously receive updated real-time instructions, advice, and/or information relevant to the operations being performed based on parameters synthesized using the MLA.

In an alternate embodiment, adjustments (e.g., to WOB) may be automatically made in response to determinations by the operation improvement engine. For example, the operation improvement engine may control components of the operational system, and may automatically adjust parameters by controlling components rather than providing instructions for the adjustments to be made.

Figure 4:
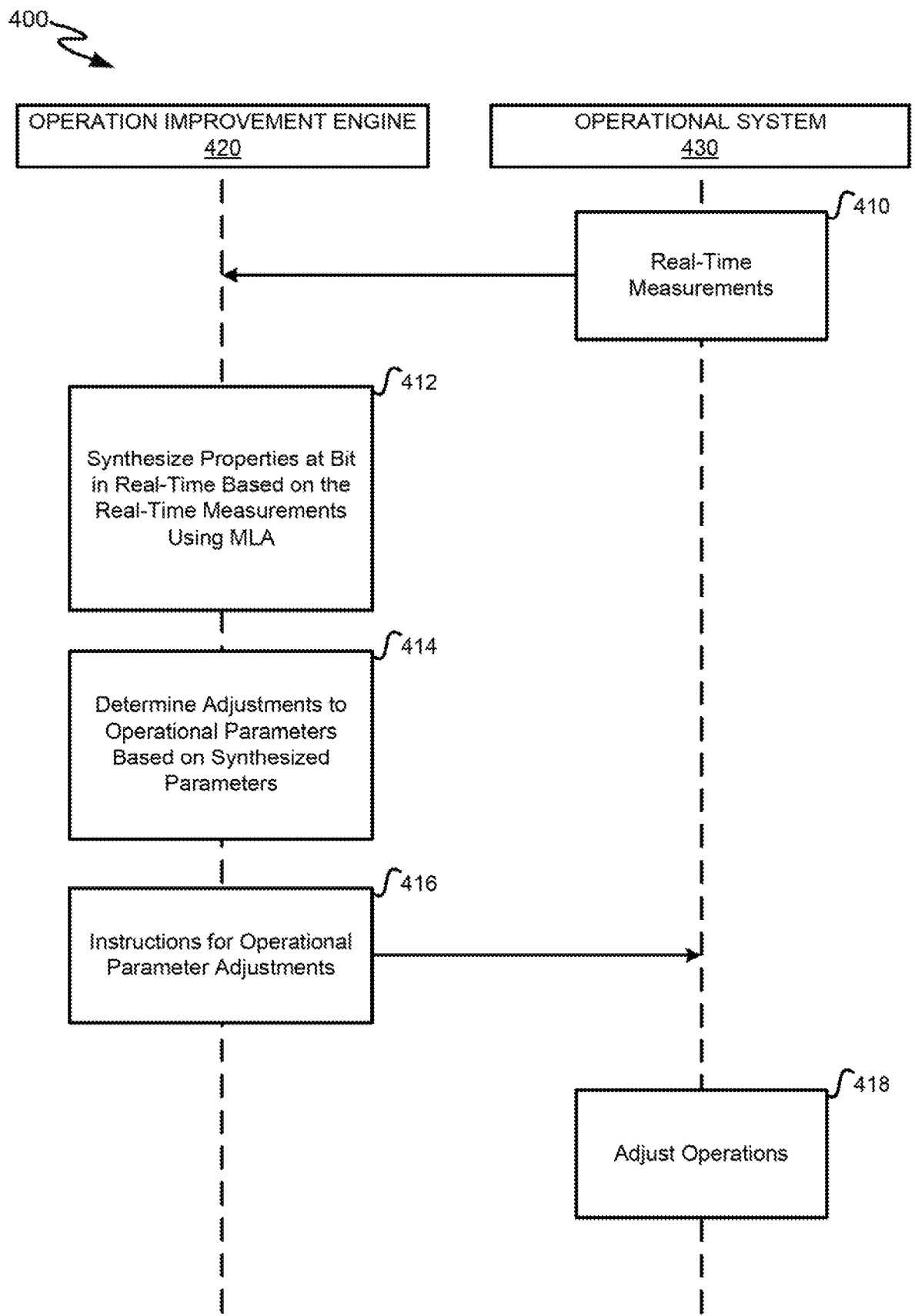
FIG. 4 illustrates an example exchange of messages between components related to synthetic logging for optimized drilling and/or steering a well, and/or stimulation of a reservoir, according to embodiments of the present disclosure.

FIG. 4 illustrates an example message exchange 400 between a operation improvement engine 420 and an operational system 430 related to real-time synthetic logging for optimized drilling and/or steering a well, and/or stimulation of a reservoir, according to embodiments of the present disclosure.

At 410, operational system 430 sends real-time measurements to operation improvement engine 420. At 412, operation improvement engine 420 synthesizes properties at or near the bit position in real-time by providing the real-time measurements to the MLA, which may synthesize properties different than the properties measured in real-time.

At 414, operation improvement engine 420 determines adjustments to one or more operational parameters based on the synthesized parameters. In some embodiments, operation improvement engine 420 may develop optimized drilling parameters comprising adjustments to one or more parameters related to MSE. Drilling parameters are only included as one example, and adjustments may alternatively or additionally be determined to one or more steering parameters and/or stimulation parameters. At 416, operation improvement engine 420 provides instructions for the operational adjustments to operational system 430.

At 418, operations are adjusted at operational system 430 in accordance with the instructions. The adjustments may, for instance be made automatically by one or more tools of operational system 430, or may, in some instances, be implemented by an engineer. Operational system 430 may continue to take real-time measurements and provide the measurements to operation improvement engine 420 in order to continuously receive updated instructions.

Figure 5:
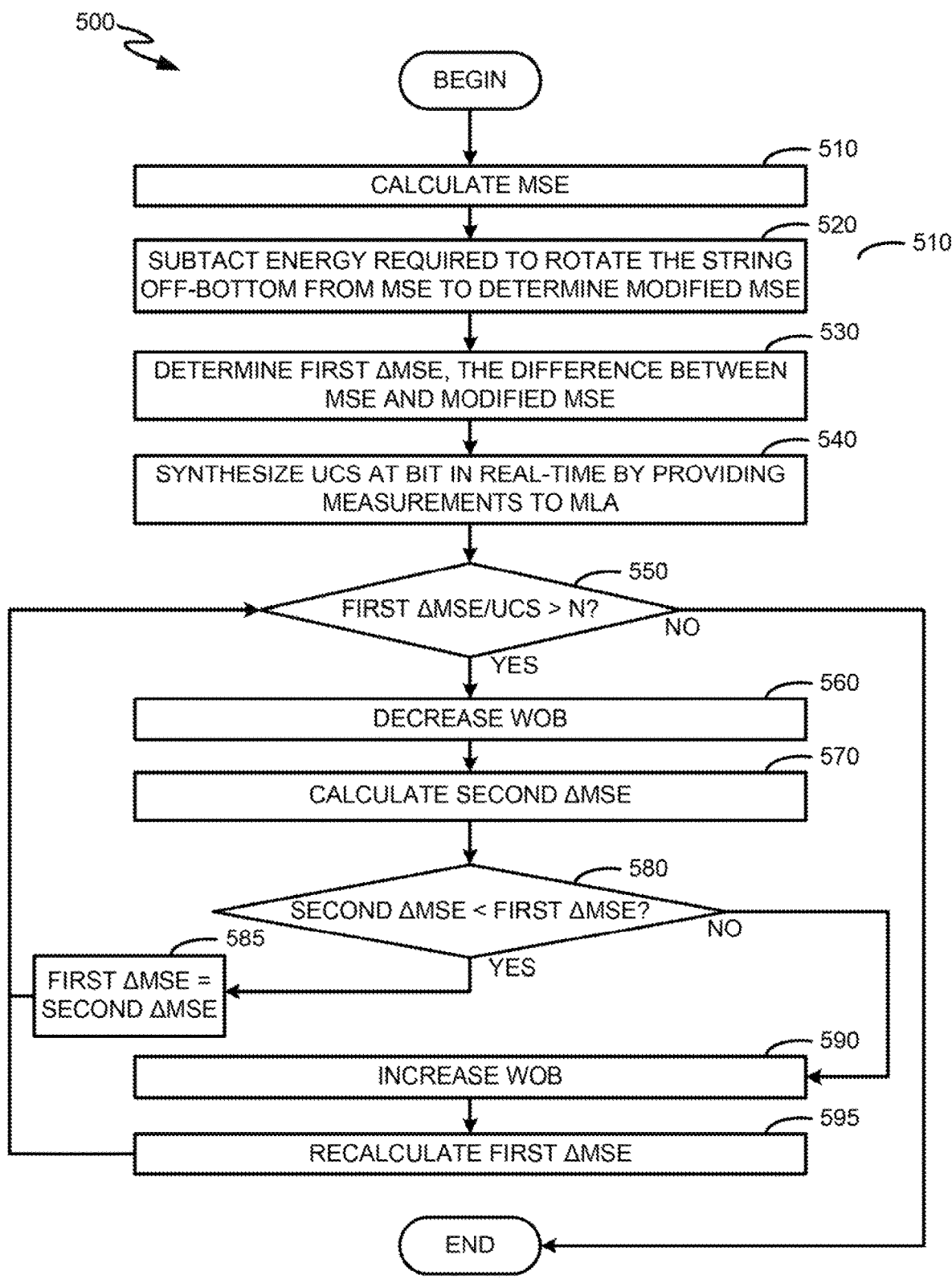
FIG. 5 illustrates example operations related to optimizing mechanical specific energy (MSE), according to embodiments of the present disclosure.

FIG. 5 illustrates example operations 500 for optimizing MSE, according to embodiments of the present disclosure. Operations 500 may, for example, be performed by an operation improvement engine in order to optimize MSE in response to MSE rising above an acceptable range.

At step 510, MSE is calculated. For example, measurements of a number of parameters such as WOB, cross-sectional area of bit, rotational rate, amount of torque applied, ROP, and the like (e.g., received from an operational system in real-time) may be used to calculate MSE.

At step 520, the energy required to rotate the string off-bottom is subtracted from MSE in order to determine a modified MSE. For example, energy applied to rotating the string (e.g., determined based on the measurements) may be subtracted from the calculated MSE, thereby resulting in the modified MSE.

At step 530, a first $\Delta$MSE is calculated by determining the difference between the on bottom and off bottom energy.

At step 540, UCS at or near the bit position is synthesized in real-time by providing the measurements to the MLA. The MLA may synthesize UCS based on the measurements, historical and/or training well data, and/or empirical relationships between parameters, such as known relationships between compressive strength and velocity.

At step 550, a determination is made as to whether a ratio of the first $\Delta$MSE over UCS is greater than a threshold N. The threshold N may, for example, be determined in advance, and may represent an outer limit of a window in which MSE is optimized with respect to UCS. If the ratio does not exceed the threshold N, then operations end, as the MSE is determined to be optimized with respect to UCS. If, however, the ration exceeds the threshold N, operations continue at step 560.

At step 560, an instruction to decrease WOB is generated. The instruction may, for example, be provided to the operational system, and WOB may be decreased at the operational system in response to the instruction. The operational system may then provide updated measurements of parameters affecting MSE to the operation improvement engine.

At step 570, a second $\Delta$MSE is calculated based on updated measurements. This may involve, for example, calculating MSE and modified MSE as described above, and determining a difference between the two.

At step 580, it is determined whether the second $\Delta$MSE is less than the first $\Delta$MSE (e.g., the $\Delta$MSE determined above at step 530). If the second $\Delta$MSE is less than the first $\Delta$MSE, then operations continue at step 585, where the first $\Delta$MSE is replaced with the value of the second $\Delta$MSE, after which operations return to step 550, where it is determined whether a ratio of the first $\Delta$MSE over UCS is greater than a threshold N. If the second $\Delta$MSE is greater than the first $\Delta$MSE, then operations continue at 590, where WOB is increased. For example, an instruction to increase WOB may be generated and provided to the operational system, and WOB may be increased at the operational system in response to the instruction. The operational system may then provide updated measurements of parameters affecting MSE to the operation improvement engine.

At step 595, the first $\Delta$MSE is recalculated based on updated measurements. This may involve, for example, calculating MSE and modified MSE as described above, and determining a difference between the two. Operations then continue at step 550, where it is determined whether a ratio of the first $\Delta$MSE over UCS is greater than a threshold N.

Operations 500 continue to be performed until the ratio of $\Delta$MSE over UCS reaches or falls below the threshold N at step 550, indicating that MSE has fallen within an optimal range with respect to UCS, at which point operations end.

In some embodiments, a step size for adjustments to WOB (e.g., increasing or decreasing WOB) is varied in order to determine the optimal amount of adjustment. For example, the step size may be increased or decreased based on whether or not an adjustment resulted in an over-correction or under-correction of MSE.

Figure 6:
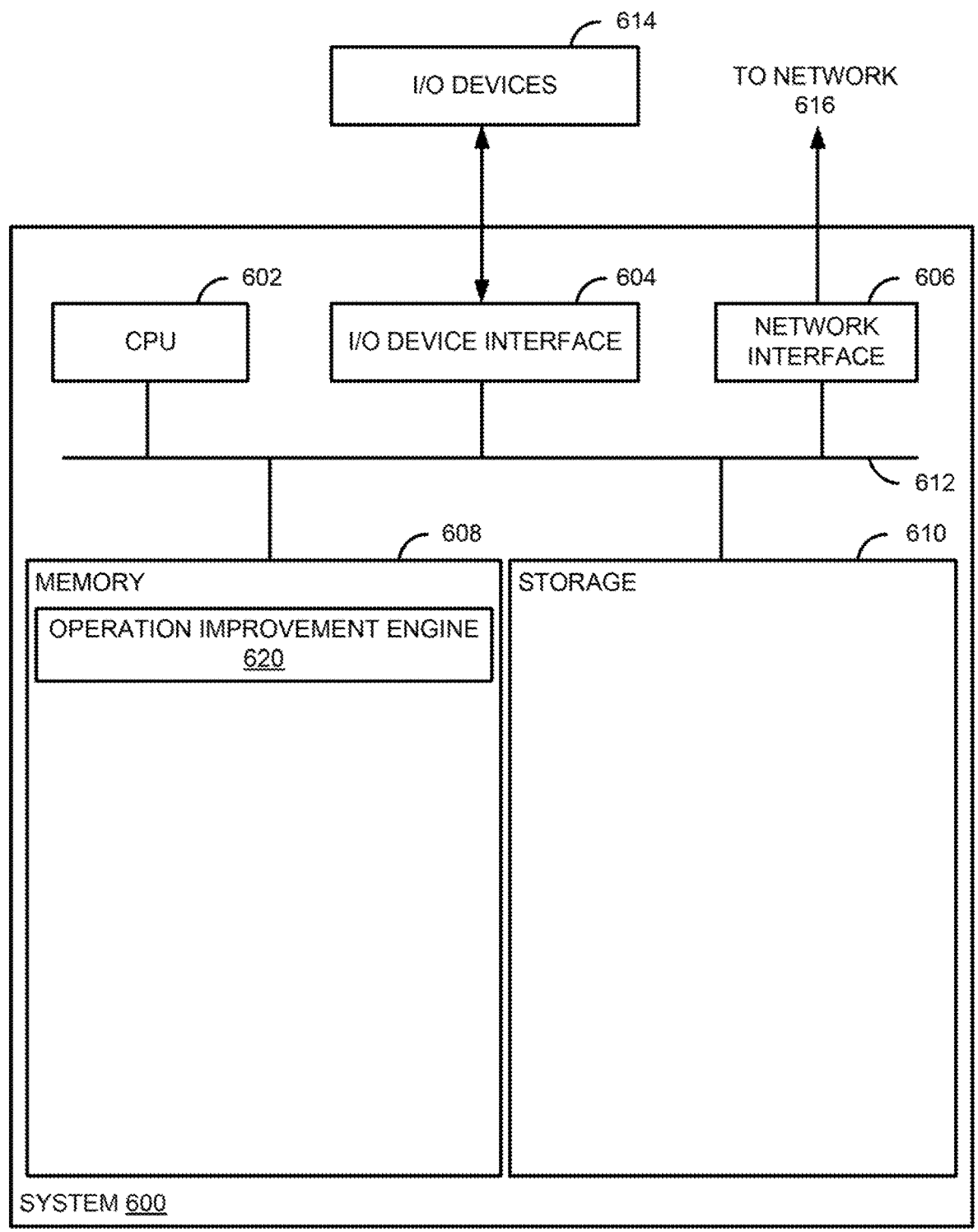
FIG. 6 illustrates an example of a computing system with which embodiments of the present disclosure may be implemented.

FIG. 6 illustrates an example computer system 600 used for real-time synthetic logging for optimized drilling and/or steering a well, and/or stimulation of a reservoir, according to embodiments of the present disclosure. As shown, the system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an operation improvement engine 620, which may comprise a neural network which runs a machine learning algorithm (MLA), and may perform operations related to real-time synthetic logging for drilling, steering, and/or stimulation optimization (e.g., functionality described above with respect to FIGS. 1-6). For example, operation improvement engine 620 may receive measurements in real-time from an operational system, and provide the measurements to the MLA in order to synthesize one or more parameters (e.g., at or near the bit position in real-time). Operation improvement engine 620 may use the synthesized parameters to provide instructions and information to the operational system (e.g., regarding optimal parameter adjustments), update earth models and seismic maps, and the like. Operation improvement engine 620 in memory 608 may communicate with other devices (e.g., components of an operational system) over a network 616 (e.g., the Internet, a local area network, or the like) through network interface 606 (e.g., in order to receive measurements, provide instructions, and the like).

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files.

Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A real-time synthetic logging method for optimizing one or more operations in a well, comprising:
   receiving measurements of one or more parameters in real time while performing operations in the well, wherein the measurements are captured without using tools that include active nuclear sources;
   providing the measurements as input to a machine learning algorithm (MLA) that is trained using historical or training well data;
   generating, using the MLA and based on the measurements, a synthetic mechanical property log of the well, wherein the synthetic mechanical property log comprises at least one option selected from the following list:
      a real-time synthesized porosity at or near the bit position;
      a real-time synthesized density at or near the bit position; and
      a real-time synthesized sonic velocity at or near the bit position; and
   determining one or more operations to perform within the well based on the synthetic mechanical property log.

2. The method of claim 1, wherein the synthetic mechanical property log of the well further comprises one of: a real-time synthesized unconfined compressive strength (UCS) at or near the bit position; or a real-time synthesized confined compressive strength (CCS) at or near the bit position.

3. The method of claim 1, wherein the one or more parameters input to the MLA are measured exclusively at the surface.

4. The method of claim 1, wherein the one or more parameters input to the MLA include survey data that is measured using a measurement while drilling (MWD) system.

5. The method of claim 1, wherein the one or more parameters input to the MLA include natural gamma data measured using a measurement while drilling (MWD) system.

6. The method of claim 1, wherein the one or more parameters do not comprise: density; velocity; UCS; or CCS measured at or near the bit position.

7. The method of claim 1, wherein the synthetic mechanical property log of the well further comprises a real-time synthesized position of one or more formation tops relative to a bit location.

8. The method of claim 1, wherein the synthetic mechanical property log of the well further comprises a real-time synthesized seismic velocity at or near the bit position.

9. The method of claim 1, wherein determining the one or more operations to perform within the well comprises:
   determining values of one or more operational parameters based on the synthetic mechanical property log in order to optimize mechanical specific energy (MSE).

10. A computer-implemented method for optimizing a reservoir drilling process, comprising:
   determining a rock property comprising one of: a real-time unconfined compressive strength (UCS) at or near the bit position; or a real-time confined compressive strength (CCS) at or near the bit position;
   determining a mechanical specific energy (MSE) of the reservoir drilling process;
   determining an amount of energy required to rotate a drill string off-bottom;
   calculating a delta MSE by subtracting the amount of energy required to rotate the drill string off-bottom from the MSE; and
   determining, based on whether a ratio between the rock property and the delta MSE exceeds a threshold, whether to modify a parameter of the reservoir drilling process.

11. The computer-implemented method of claim 10, wherein determining the MSE is based on measurements of at least one of the following: a weight on bit (WOB), a cross-sectional area of bit, a rotational rate, an amount of torque applied, and a rate of penetration (ROP).

12. The computer-implemented method of claim 10, wherein the threshold represents an outer limit of a window in which the delta MSE is optimized with respect to the rock property.

13. The computer-implemented method of claim 10, further comprising: adjusting the parameter until the ratio between the rock property and the delta MSE falls below the threshold.

14. The computer-implemented method of claim 10, wherein the parameter comprises one of: weight on bit (WOB); revolutions per minute (RPM), flow rate, or pressure.

15. A system comprising:
one or more processors; and
a non-transitory computer-readable medium comprising instructions that, when executed, cause the one or more processors to perform a real-time synthetic logging method for optimizing one or more operations in a well, the method comprising:
receiving measurements of one or more parameters in real time while performing operations in the well, wherein the measurements are captured without using tools that include active nuclear sources;
providing the measurements as input to a machine learning algorithm (MLA) that is trained using historical or training well data;
generating, using the MLA and based on the measurements, a synthetic mechanical property log of the well, wherein the synthetic mechanical property log comprises at least one option selected from the following list:
a real-time synthesized porosity at or near the bit position;
a real-time synthesized density at or near the bit position; and
a real-time synthesized sonic velocity at or near the bit position; and
determining one or more operations to perform within the well based on the synthetic mechanical property log.

16. The system of claim 15, wherein the synthetic mechanical property log of the well further comprises one of: a real-time synthesized unconfined compressive strength (UCS) at or near the bit position; or a real-time synthesized confined compressive strength (CCS) at or near the bit position.

17. The system of claim 15, wherein the one or more parameters are captured using a measurement while drilling (MWD) system.

18. The system of claim 15, wherein the one or more parameters do not comprise: density; velocity; UCS; or CCS.

19. The system of claim 15, wherein the synthetic mechanical property log of the well further comprises a real-time synthesized position of one or more formation tops relative to a bit location.

20. The system of claim 15, wherein the synthetic mechanical property log of the well further comprises a real-time synthesized seismic velocity at or near the bit position.

* * * * *